(12) United States Patent
Nogi et al.

(10) Patent No.: US 7,288,601 B2
(45) Date of Patent: Oct. 30, 2007

(54) METHOD FOR PRODUCTION OF WATER-ABSORBENT RESIN AND PLOW-SHAPED MIXING DEVICE

(75) Inventors: Kozo Nogi, Kakogawa (JP); Masazumi Sasabe, Kakogawa (JP); Kenji Kadonaga, Kakogawa (JP); Yoshio Irie, Himeji (JP); Shigeru Sakamoto, Himeji (JP); Koji Miyake, Okayama (JP)

(73) Assignee: Nippon Shokubai Co., Ltd., Osaka (JP)

( * ) Notice: Subject to any disclaimer, the term of this patent is extended or adjusted under 35 U.S.C. 154(b) by 518 days.

(21) Appl. No.: 10/854,881

(22) Filed: May 27, 2004

(65) Prior Publication Data

US 2004/0240316 A1 Dec. 2, 2004

(30) Foreign Application Priority Data

May 30, 2003 (JP) ............................. 2003-154923

(51) Int. Cl.
  *C08F 8/00* (2006.01)
  *C08F 20/04* (2006.01)
  *B01F 3/08* (2006.01)
(52) U.S. Cl. ............................. 525/329.5; 525/329.7; 525/330.2; 526/930; 528/502 R
(58) Field of Classification Search ............... 526/930; 525/329.5, 329.7, 330.2; 528/502 R
  See application file for complete search history.

(56) References Cited

U.S. PATENT DOCUMENTS

| | | | |
|---|---|---|---|
| 3,661,815 A | 5/1972 | Smith | 260/17.4 |
| 4,076,663 A | 2/1978 | Masuda et al. | 260/17.4 |
| 4,857,610 A | 8/1989 | Chmelir et al. | 526/88 |
| 5,140,076 A | 8/1992 | Hatsuda et al. | 525/375 |
| 5,250,640 A | 10/1993 | Irie et al. | 526/88 |
| 6,071,976 A | 6/2000 | Dairoku et al. | 521/50 |
| 6,565,768 B1 | 5/2003 | Dentler et al. | 252/194 |
| 6,720,389 B2 | 4/2004 | Hatsuda et al. | 525/330.1 |
| 2002/0040095 A1 | 4/2002 | Dairoku et al. | 524/832 |
| 2004/0181031 A1* | 9/2004 | Nogi et al. | 528/480 |
| 2005/0065237 A1* | 3/2005 | Schmidt et al. | 523/210 |

FOREIGN PATENT DOCUMENTS

| | | |
|---|---|---|
| DE | 12 76 986 | 9/1968 |
| EP | 0 505 163 | 9/1992 |
| EP | 1 146 067 A1 | 10/2001 |
| JP | 52-14689 | 2/1977 |
| JP | 53-15959 | 5/1978 |
| JP | 55-84304 | 6/1980 |
| JP | 59 154437 | 1/1985 |
| JP | 11-267500 | 10/1999 |
| JP | 11-349625 | 12/1999 |

* cited by examiner

*Primary Examiner*—Fred Teskin
(74) *Attorney, Agent, or Firm*—Occhiuti Rohlicek & Tsao LLP (57) ABSTRACT

A method for mixing a water-absorbent resin and a surface cross-linking agent-containing solution to repress aggregates is equipped. The water-absorbent resin and the surface cross-linking agent-containing solution is mixed with a plow-shaped mixing device which is equipped with an inner wall formed of material manifesting an interfacial contact angle of not less than 60° to water and possessing a temperature of heat distortion of not lower than 70° C., a plow-shaped stirring vane and a disintegrating blade.

12 Claims, 1 Drawing Sheet

METHOD FOR PRODUCTION OF WATER-ABSORBENT RESIN AND PLOW-SHAPED MIXING DEVICE

BACKGROUND OF THE INVENTION

1. Field of the Invention

This invention relates to a method for modifying a water-absorbent resin comprising a step of mixing a water-absorbent resin and an aqueous solution and a method for producing a modified water-absorbent resin. More particularly, this invention relates to a method for modification of a water-absorbent resin comprising a step of uniformly mixing a water-absorbent resin and an aqueous solution by using a mixing device of a specific construction, or by adding the aqueous solution in a specific range to the water-absorbent resin, and a mixing device optimally suitable for the method.

2. Description of the Related Art

The water-absorbent resin possesses a characteristic property of absorbing a large volume of water and is used for materials forming sanitary articles such as disposable diapers, sanitary napkins, and incontinence pads, water-retaining agents for soil, and drip sheets for foodstuffs. Particularly for application to such hygienic articles as disposable diapers, the desirability of developing a water-absorbent resin having a high absorption capacity under pressure has been requested with a view to conferring decreased thicknesses on such products. The water-absorbent resin of this sort is generally produced by undergoing such steps as formation of a hydrated gel polymer, drying, pulverization, and classification. For the purpose of imparting further exalted absorption properties, the water-absorbent resin is modified frequently by the addition of various water-soluble compounds. The surface cross-linkage of the water-absorbent resin is one conceivable approach to the modification and it necessitates a step of mixing a water-absorbent resin powder and an aqueous solution containing a surface cross-linking agent (JP-A-1992-214734).

The solid-liquid system is stirred and mixed in order to suspend solid particles and uniformly diffuse the liquid phase encircling the solid particles. When the solid is a water-absorbent resin, the solid and the liquid are not easily mixed uniformly and are liable to form aggregates because the water-absorbent resin after addition of the aqueous solution immediately absorbs the liquid.

With a view to effecting the mixture satisfactorily, JP-A-1992-214734 indicates use of a high-speed stirring type mixer having an inner surface formed substantially of material manifesting an interfacial contact angle of not less than about 60° to water and possessing a temperature of heat distortion of not lower than about 70° C. As concrete examples of the high-speed stirring type mixer, mixers of the type having rotary vanes equipped on the inner surface of the bottom part of a stirring tank such as Henschel Mixer, New Speed Mixer, and Heavy Duty Matrix and mixers of the type equipped on the inner side thereof with a cylindrical container and adapted to effect continuous mixture of two or more kinds of powder or a liquid and a powder by high-speed rotation of a rotor fitted with a multiplicity of paddles such as Turburizer and Sand Turbo may be cited. This publication has a mention that a continuous mixer possesses high productivity.

Then, as a means to perform covalent bond type surface cross-linkage on dried and finely divided hydrogel particulates, a method which obtains a product by introducing a hydroxy gel powder and a solution of ethylene glycol diglycidyl ether, water, and 1,2-propane diol as kept mixed into a plow-shaped mixing device over a period of 5-10 minutes and subsequently heating, and cooling the resultant mixture is described (Example 7 in JP-A-2002-527547). From the embodiment given in this example that the mixing operation was continued over a period of at least five minutes and the product was classified with sieves to remove particles measuring 120-850 µm in diameter, it is inferred that aggregates are generated in this example.

A method has been known which, in mixing water-absorbent resin particles and liquid drops by the use of a mixing device equipped with a stirring axis fitted with a plurality of paddles, operates the device with the linear velocity of the leading terminals of paddles set in a rang of 250-3,000 m/min (JP-A-1999-349625). In one working example cited in this publication, a surface cross-linking agent-containing solution was mixed by spraying with a water-absorbent resin by using a high-speed stirring mixing device such as Turburizer, with the rotational frequency of the Turburier set at 2,160 rpm. The mixing device, as described in the specification, was furnished with an inner surface coated with Teflon and equipped on the circumferences of paddles (vanes) with protrusions so disposed as to induce turbulence and consequently exalted the mixing property of the device.

A method has been disclosed which produces a water absorbing agent endowed with prescribed properties by mixing a carboxyl group-containing water-absorbent resin and an aqueous solution by means of a stirring continuous extrusion type mixing device equipped around a rotary shaft in the inner part of a stationary cylinder with at least one stirring member adapted to exert extruding thrust force on the water-absorbent resin (JP-A-1997-235378). Since this mixing device has the stirring member so disposed as to secure a mixing region on the discharge side of a diffusing region, the mixture of the water-absorbent resin and the aqueous solution proceeds in two or more states of agitation, namely dispersion and admixture.

A method has been disclosed which, for the purpose of enabling uniform mixture of a water-absorbent resin and a liquid substance to proceed very easily and stably for a long time, causes the water-absorbent resin and the liquid substance to be mixed by the use of a mixing device equipped with a spray nozzle (JP-A-2002-201290). This method is supposed to comprise spraying a water-absorbent resin through a spray nozzle in the shape of an empty cone describing an annular spray pattern or in the shape of an elliptic cone describing a biconvex lens spray pattern, drying the product of spraying, pulverizing the dry water-absorbent resin, and heat-treating the pulverized water-absorbent resin in an atmosphere having a dew point of not higher than 60° C. and a temperature of not lower than 90° C. As the mixing devices which are available for this method, a cylindrical mixing device, a double wall conical mixing device, a V-shaped mixing device, a ribbon type mixing device, a screw type mixing device, a fluidized type furnace rotary disc type mixing device, an air flow type mixing device, an inner mixing device, a pulverizer type kneader, a rotary type mixing device, and a screw type extruding device are cited. In the working examples, a Turburizer was used as a continuous high-speed stirring and mixing device.

For the modification of the surface of a water-absorbent resin, the step of mixing the water-absorbent resin and an aqueous solution containing a surface modifying agent indeed is an indispensable requirement. Since the water-absorbent resin, on contacting an aqueous solution, immediately absorbs the aqueous solution and swells or exerts stickiness, the aqueous solution is uniformly mixed with the water-absorbent resin only with difficulty. Even the method mentioned above, therefore, suffers occurrence of aggregates.

Further, since the water-absorbent resin swells and retains the stickiness, it adheres to the interior of the device. The aggregates occur also in consequence of the growth of the resultant deposit. Further, the occurrence of the deposit possibly renders continuous operation of the device difficult. This invention, therefore, aims to provide a mixing method which efficiently executes uniform mixture of a water-absorbent resin and an aqueous solution.

The water-absorbent resin is generally preferred to contain particulates of particle diameters of not more than 150 μm in the smallest possible amount. These particulates in such a water-absorbing product as a disposable diaper clog in the product and constitute a factor for degrading the ability of the product to pass liquid. Even when the particulates are treated with a surface cross-linking agent, the treatment does not easily attain exaltation of various solid state properties such as an absorption capacity under pressure but entails such problems as incurring loss due to the disposal of useless scrap and consequently degrading the yield and adding to the cost of waste disposal. This invention is directed toward providing a method for producing a water-absorbent resin which does not appreciably contain particulates.

SUMMARY OF THE INVENTION

After a diligent study regarding the occurrence of fine powder, the present inventor has found that the process of mixing a water-absorbent resin and a surface modifying agent-containing aqueous solution suffers occurrence of aggregates when they are not uniformly mixed and that the pulverization of these aggregates subsequent to surface modification gives rise to fine powder. It has been further found that the occurrence of the fine powder can be repressed by effecting the mixture in the mixing process uniformly because the uniform mixture precludes the occurrence of aggregates and that even when aggregates still occur, the process of pulverizing these aggregates can be avoided by disintegrating them in a mixing device. This invention has been perfected as a result.

Specifically, this invention consists in accomplishing uniform mixture of a water-absorbent resin and an aqueous solution by causing particles of the water-absorbent resin to be efficiently retained in a suspended and fluidized state by the use of a plow-shaped mixing device having a plurality of plow-shaped stirring vanes attached to a rotary shaft and adding the aqueous solution thereto and mixing. When the device is equipped therein with such disintegrating blades, the aggregates occurring at all can be disintegrated in a wet state. When the device is equipped with an inner wall formed of such material as polyethylene tetrafluoride which manifests the interfacial contact angle of not less than 60° and possesses a temperature of heat distortion of not lower than 70° C., the mixture of the water-absorbent resin and the aqueous solution and the aggregates do not easily adhere to the inner face and the mixture can be continuously discharged from the mixing device.

During the mixture of the water-absorbent resin and the aqueous solution containing a surface cross-linking agent, the occurrence of aggregates can be repressed by adjusting the ratio of addition of the aqueous solution so that the ratio of the volume of the water-absorbent resin (D) prior to the addition of the aqueous solution and the volume of the water-absorbent resin (W) after the addition and mixture of the aqueous solution, (W/D), may fall in the range of 1.2-2.5.

By using a plow-shaped mixing device of a specific construction contemplated by this invention, it is made possible to mix uniformly a water-absorbent resin and a surface cross-linking agent-containing aqueous solution and consequently repress the occurrence of aggregates.

The device mentioned above is produced by equipping a conventional plow-shaped mixing device with an inner wall formed of a specific material, equipping the inner wall as well with groove parts, and further equipping the mixing device with disintegrating blades. This device itself is easy to manufacture. This invention, by using the device of this construction, is enabled to obtain a uniform water-absorbent resin containing aggregates only in a small amount, although the device has a lower rotational velocity and a shorter hold up time than the conventional device.

DESCRIPTION OF THE PREFERRED EMBODIMENT

The first aspect of this invention is directed toward a method for modifying a water-absorbent resin comprising a step of mixing a water-absorbent resin possessing a carboxyl group and an aqueous solution containing a surface cross-linking agent, wherein said water-absorbent resin and said aqueous solution are mixed with a mixing device equipped with a plow-shaped stirring vane and a disintegrating blade, an inner wall of which device is formed of material manifesting the interfacial contact angle of not less than 60° to water and possessing a temperature of heat distortion of not lower than 70° C.

Figure 2:
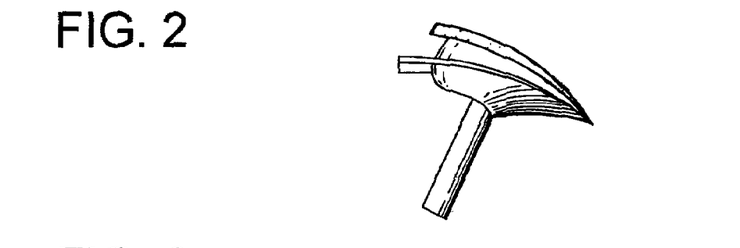
FIG. 2 is a diagram illustrating a plow-shaped stirring vane to be used in the plow-shaped mixing device.

While various mixing devices are available for stirring and mixing a solid-liquid system, this invention avails itself of a mixing device which is equipped on a rotary shaft in the interior thereof with a plurality of plow-shaped stirring vanes (hereinafter occasionally referred to simply as a "plow-shaped mixing device"). The term "plow-shaped" as used in the present specification refers to the shape of a shovel disposed on a rotary axis and having two vanes thrust backward relative to the direction of rotation of the shovel. FIG. 2 illustrates one form of the plow-shaped stirring vane, though not limitatively. The high-speed stirring mixing device which has been conventionally used is operated at a stirring speed of more than 500 rpm and preferably not less than 1,000 rpm, with the hold up time of the water-absorbent resin in the mixing device generally set below 5 seconds. In contrast, the plow-shaped mixing device used in this invention is classified under the category of low stirring and mixing speed. Generally, a mixing device which has a low stirring speed is required to use a long hold up time and, in this respect, is disposed to encourage occurrence of aggregates. The plow-shaped mixing device centrifugally diffuses the water-absorbent resin and then retains it in a suspended and fluidized state by means of plow-shaped stirring vanes, with the result that the water-absorbent resin will be uniformly mixed with the aqueous solution and the aggregates will not easily occur. Even when the aggregates are suffered to occur at all, they can be disintegrated with the disintegrating blades. Since the mixture mentioned above is discharged from the mixing device without giving rise to fine powder, the mixing device lends itself to the materialization of a continuous production of the water-absorbent resin on a commercial scale. Further, the fact that the inner wall of the device is formed of such material as polyethylene tetrafluoride which manifests the interfacial contact angle of not less than 60° to water and possesses a temperature of heat distortion of not lower than 70° C. also contributes to the continuous operation by disabling adhesion of the mixture of the water-absorbent resin and the aqueous solution and the aggregates thereof to the inner wall.

Figure 1:
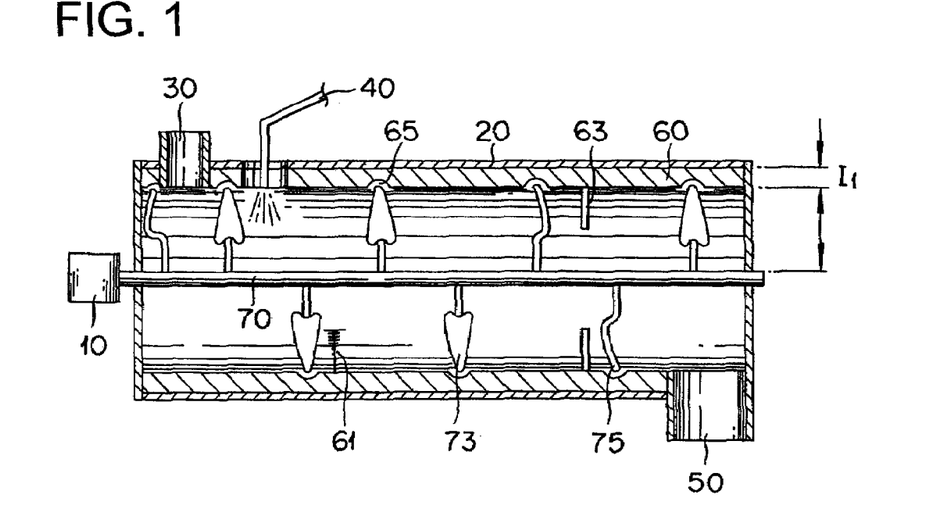
FIG. 1 is a type section illustrating one example of a plow-shaped mixing device preferably usable for the method of modification contemplated by this invention.

The plow-shaped mixing device to be used extensively in this invention has to be composed, as illustrated in FIG. 1, of a drive unit 10, a horizontal drum 20, a raw material supply port 30, an aqueous solution supply nozzle 40, and an exhaust port 50, the drum being equipped therein with an inner wall 60 formed of material manifesting the interfacial contact angle of not less than 60° to water and possessing a temperature of heat distortion of not lower than 70° C. and a rotary shaft 70 rotated by the drive unit 10 and having plow-shaped stirring vanes 73 and disintegrating blades 61 disposed thereon.

The water-absorbent resin supplied via the raw material supply port 30 is suspended by the plow-shaped stirring vanes 73 rotated in concert with the rotation of the drive unit 10 and then stirred and mixed with the aqueous solution sprayed through the nozzle 40. The water-absorbent resin suspended and stirred by the centrifugal force of the plow-shaped stirring vanes 73 and wetted with the aqueous solution is dispersed by the centrifugal force in the direction of the inner wall 60 of the device. Since the material forming the inner wall manifests the interfacial contact angle of not less than 60° to water, the water-absorbent resin does not adhere to the inner wall and, even when it adheres thereto at all, the deposit readily falls down and does not grow. The water-absorbent resin and the aqueous solution which are continuously supplied are mixed by the rotation of the plow-shaped stirring vanes 73 and moved as well through the empty space enclosed with the inner wall 60 toward the exhaust port 50 and eventually discharged therethrough. Incidentally, the inner wall 60 of the bottom part of the device is equipped with the disintegrating blades 61. When the water-absorbent resin forms aggregates, these aggregates are accumulated by the gravitational attraction on the bottom part of the device and are disintegrated by the disintegrating blades 61 and subsequently discharged.

For this invention, the disintegrating blades 61 are indispensable. The stirring and mixing device such as the plow-shaped mixing device which operates at a low speed, aggregates are liable to occur even when the mixture is effected uniformly. Thus, the device is equipped with the disintegrating blades 61 for the purpose of disintegrating the aggregates thereby ensuring continuous production. Though the positions for setting the disintegrating blades 61 do not need to be particularly restricted, they are preferred to be in the neighborhood of the plow-shaped stirring vanes 73 on the bottom of the device because the centrifugal force of the stirring vanes 73 and the rotation of the disintegrating blades 61 cooperate to facilitate the disintegrating. Though the rotational frequency of the disintegrating blades 61 may be properly selected to suit the rotational frequency of the plow-shaped stirring vanes 73, it is preferably in the range of 1,000-6,000 rpm and more preferably 1,500-4,000 rpm. If this rotational frequency falls short of 1,000 rpm, the shortage will result is loss of the disintegrating action. Conversely, if it exceeds 6,000 rpm, the excess will result in inducing mechanical breakage of the water-absorbent resin.

As the material for forming the inner wall 60 of the drum, namely the material manifesting the interfacial contact angle of not less than 60° to water and possessing a temperature of heat distortion of not lower than 70° C., synthetic resins such as polyethylene, polypropylene, polyesters, polyamides, fluorine resin, polyvinyl chloride, epoxy resin, and silicone resin, inorganic fillers such as glass, graphite, bronze, and molybdenum disulfide, and synthetic resins reinforced with a composite made of such an organic filler as polyimide are available. In the substances just cited, fluorine resins such as polyethylene tetrafluoride, polyethylene trifluoride, polyethylene trifluorochloride, ethylene tetrafluoride-ethylene copolymer, ethylene trifluorochloride-ethylene copolymer, propylene pentafluoride-ethylene tetrafluoride copolymer, perfluoroalkylvinylether-ethylenetetrafluoride copolymer, and polyvinyl fluoride prove particularly favorable. If the temperature of heat distortion falls short of 70° C., the shortage will prevent the inner wall from easily withstanding the heat generated during the course of mixture. If the interfacial contact angle of the material of the inner wall to water falls short of 60°, the shortage will possibly result in inducing heavy adhesion of the water-absorbent resin to the inner wall, rendering uniform mixture of the water-absorbent resin with the aqueous solution difficult, and consequently degrading the absorption properties of the water-absorbent resin.

The thickness of the inner wall 60 (indicated by $I_1$ in FIG. 1) is properly not less than 2 mm and particularly preferably falls in the range of 5-30 mm. If the thickness of the inner wall falls short of 2 mm, the shortage will render the material forming the inner wall deficient in durability.

This invention prefers the inner wall 60 to be equipped with a groove part 65 such that the shortest distance between the plow-shaped stirring vanes and the inner wall 60 may fall in the range of 1-30 mm, preferably 2-20 mm. The groove part 65 is preferred to be formed annularly or spirally in the inner wall 60 and particularly to be formed on the circumferences of rotation of the stirring vanes 73 on the inner wall 60. These groove parts 65 are preferred to be formed one each for each of the plow-shaped stirring vanes 73 because the groove parts 65 thus formed preclude the so-called short pass, i.e. the discharge of the water-absorbent resin in a state not yet thoroughly mixed with the aqueous solution, and enable the water-absorbent resin to be mixed with the aqueous solution without being crushed between the back surfaces of the plow-shaped stirring vanes 73 and the inner wall 60 of the drum. By the same token, when the device is equipped with feeding feathers 75, the groove parts 65 may be formed on the circumferences of rotation of the feeding feathers 75 so that the shortest distance between the feeding feathers 75 and the inner wall 60 may fall in the range of 1-30 mm. These feeding feathers 75 are preferred to be in an annularly or spirally streamlined shape lest they should induce a drift of the water-absorbent resin.

Figure 3:
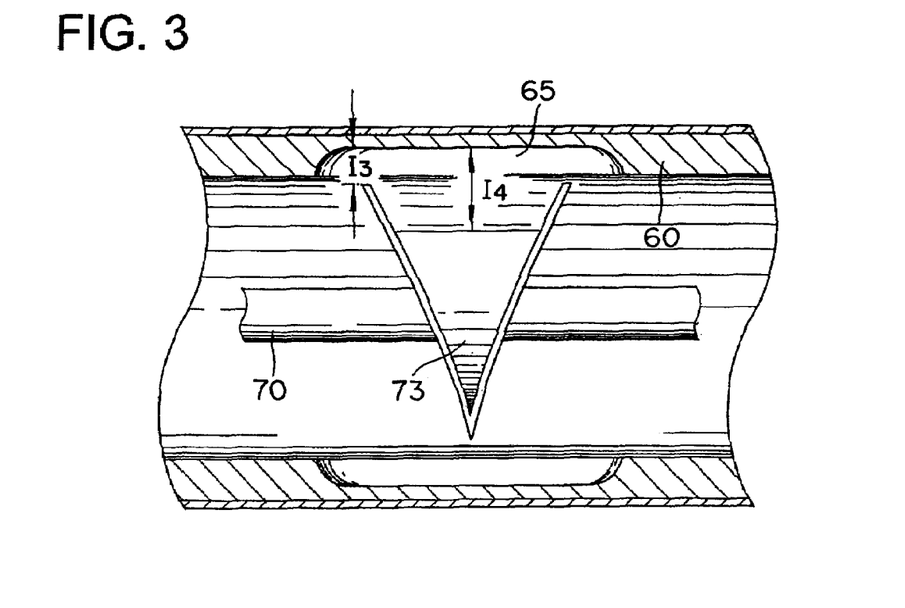
FIG. 3 is a type section illustrating the interval of a groove part between the plow-shaped stirring vane and the inner wall.

The shape of such a plow-shaped stirring vane 73 is illustrated in FIG. 2 and the relation of the groove parts 65 which are formed between the plow-shaped stirring vanes 73 and the inner wall 60. As illustrated in FIG. 3, the groove parts 65 in this invention constitute the smallest distance $I_3$ between the plow-shaped stirring vanes 73 and the inner wall 60 and this distance $I_3$ is only required to fall in the range of 1-30 mm. The largest distance $I_4$, therefore, may be larger than the range mentioned above.

The device may be equipped on the inner wall 60 of the drum with weirs 63 in addition to the feeding feathers 75. Though these weirs maybe properly selected to suit the inside diameter of the drum, the size of the plow-shaped stirring devices 73, the thickness of the inner wall, and the target hold up time, they are preferred to have a width falling in the range of 5-10 mm, a height not exceeding 50% of the diameter of the circumference of rotation, and an overall opening exceeding 10% of the cross section of the circumference of rotation. The weirs may be notches or gaps. The drum may be equipped therein with not less than one such weir or two more such weirs because the weirs so disposed prevent the water-absorbent resin from short pass, extend the hold up time, and consequently enhance the mixing property of the device.

When the weirs are installed, it is preferable to have plow-shaped stirring vanes or feeding feathers disposed one each before and after the weirs because they serve the purpose of preventing the blockage of the opening parts with the water-absorbent resin mixed with the aqueous solution and the adhesion of the water-absorbent resin to the surfaces of the weirs.

The weirs 63 may be optionally interposed between adjacent plow-shaped stirring vanes 73 or between the disintegrating blades 61 and the plow-shaped stirring vanes 73. The reason for this interposition is that the water-absorbent resin can be prevented from being discharged in a state not yet thoroughly mixed with the aqueous solution.

The water-absorbent resin is a general-purpose resin which demonstrates utility in a wide variety of products and fits mass production. It is, therefore, required to be uniformly mixed in a short period of time and manufactured by a continuous operation. According to this invention, the uniform mixture can be attained by fixing the stirring speed of the device in a range of 100-500 rpm, particularly 100-300 rpm. If the stirring speed falls short of 100 rpm, the shortage will result in preventing the water-absorbent resin from being dispersed satisfactorily in the mixing device and consequently rendering the uniform mixture difficult. Conversely, if the stirring speed exceeds 500 rpm, the excess will possibly result in obstructing the acquisition of a hold up time necessary for mutual contact of the water-absorbent resin and the aqueous solution and consequently rendering the mixture not uniform. Then, the sufficient hold up time in the device is in the range of 10 seconds-three minutes and preferably in the range of 30 seconds-two minutes. If the hold up time falls short of 10 seconds, the shortage will render the mutual contact of the water-absorbent resin and the liquid drops difficult and tend to disrupt the uniform mixture thereof. Conversely, if the hold up time exceeds three minutes, the excess will tend to induce occurrence of aggregates and formation of a deposit inside the mixing device. In this invention, owing to the use of the plow-shaped mixing device, the productivity is high because the uniform mixture can be attained in a short period time in spite of a low stirring speed. Moreover, since the water-absorbent resin and the aqueous solution can be uniformly mixed in a short period of time, the occurrence of aggregates can be repressed and, as a result, the water-absorbent resin excelling in absorption properties and having repressed the occurrence of minute powder can be manufactured.

The filling factor of the water-absorbent resin in the device does not need to be particularly restricted but properly falls in the range of 0.1-0.6 kg/L and particularly preferably falls in the range of 0.18-0.36 kg/L based on the weight of the water-absorbent resin during the introduction thereof into the mixing device. If the filling factor falls short of 0.1 kg/L, the shortage will possibly render the mutual contact of the water-absorbent resin and the aqueous solution difficult and disrupt the uniform mixture. Conversely, if this filling factor exceeds 0.6 kg/L, the excess will result in swelling the water-absorbent resin and the aqueous solution to the extent of obstructing the acquisition of an empty space for their mutual contact, disrupting the uniform mixture, inducing occurrence of deposits and aggregates in the mixing device, and rendering the continuous mixture difficult.

The amount of the water-absorbent resin to be added preferably falls in the range of 0.01-200 mL and more preferably in the range of 0.5-100 mL. The water-absorbent resin indeed swells by absorbing water as described above. When the amount of the addition is within the range mentioned above, the empty space necessary for the mixture can be secured in the device even after the addition of the aqueous solution and the aggregates do not appreciably occur. The amount of the surface cross-linking agent necessary for the water-absorbent resin can be set in the optimum range, depending on the number of carboxyl groups possessed by the water-absorbent resin. Thus, by having the surface cross-linking agent in the necessary amount dissolved in advance in the aqueous solution in the amount falling in the aforementioned range, the adjustment of the water-absorbent resin and the aqueous solution can be easily attained.

The method for the addition of the aqueous solution does not need to be particularly restricted. For this addition to proceed uniformly, it is commendable to spray the aqueous solution though the nozzle 40. The pressure of spray, the diameter of the exhaust nozzle, the area of spray, the diameter of the spray nozzle, etc. may be properly selected to suit the viscosity of the aqueous solution and the amount of addition of the aqueous solution per unit time.

The second aspect of this invention is directed toward a method for modifying a water-absorbent resin comprising a step of mixing a water-absorbent resin possessing a carboxyl group and an aqueous solution containing a surface cross-linking agent, wherein said water-absorbent resin and said aqueous solution are mixed with a rotary type mixing device equipped on the inner wall thereof with a weir, and/or equipped on the circumference of rotation of a stirring vane on said inner wall with a groove part so formed as to insert a distance in the range of 1-30 mm between said inner wall and said stirring vane. It has been found that the mixability of the water-absorbent resin and the aqueous solution depends on the degree with which the water-absorbent resin is mixed with itself in the rotary mixing device and the contact time between the water-absorbent resin and the aqueous solution. This relation is not affected by the kind of the stirring vanes. The stirring vanes may be in any of the known shapes such as, for example, a plow, a blade, a fan, and a beam. The material of the inner wall is irrelevant. In the meantime, the shortest distance between the stirring vanes and the inner wall is in the range of 0.5-30 mm, preferably 1-20 mm, and particularly 3-10 mm. When the grooves are not disposed, the distance between the inner wall and the stirring vanes generally falls in the range of 0.5-10 mm. The shortest distance between the stirring vanes and the inner wall is the same as in the case of the relation of the grooves 65 which are formed between the stirring vanes 73 which happen to be plow-shaped stirring vanes 73 and the inner wall 60. The grooves 65 contemplated by this invention are such that the shortest distance between the stirring vanes (plow-shaped stirring vanes 73) and the inner wall 60 is $I_3$. This distance, $I_3$, is required to fall in the range of 0.5-30 mm. The largest distance, $I_4$, therefore, maybe larger than the range mentioned above. If the distance falls short of 0.5 mm, the shortage will tend to urge the water-absorbent resin to mix with itself and consequently induce occurrence of aggregates and suffer the water-absorbent resin to adhere to the inner wall and as well suffer the resultant deposit to grow till it forms aggregates. Conversely, if the largest distance exceeds 30 mm, the excess will possibly render sufficiently uniform mixture difficult. A decrease in the clearance between the stirring vanes and the inner wall may suffice to prevent the short pass. This decrease, however, has the possibility of blocking the gap between the vanes and the inner wall with the water-absorbent resin. By equipping the stirring vanes on the circumferences thereof with the grooves, it is made possible to prevent the water-absorbent resin from blocking the gap and accomplish uniform mixing as well.

In this invention, the mixing time of the water-absorbent resin, namely the hold up time within the device, falls in the range of 0.1 second-three minutes, preferably in the range of 0.5 second-one minute. Thus, the height of the weirs has to be so adjusted that the hold up time may fall in the range mentioned above. The number of weirs does not need to be limited to one. The positions for installing such weirs are preferred to be in the neighborhood of the outlet port because they permit easy control of the hold up time. By having the weirs disposed each between the stirring vanes and the stirring feathers, it is made possible to enhance the uniformity of mixture and prevent the water-absorbent resin from blocking the weirs as well.

The rotational frequency of the paddles preferably falls in the range of 100-5,000 rpm and more preferably in the range of 150-3,000 rpm and it may be properly selected to suit the hold up time and the presence or absence of the occurrence of aggregates. By having the grooves or the weirs disposed inside the mixing device, it is made possible to prevent the supplied water-absorbent resin from short pass. Then, since the occurrence of resin not coated with the aqueous solution and the occurrence of resin to which the aqueous solution has been excessively added are consequently repressed, the heat-treated water-absorbent resin acquires exalted properties and the occurrence of aggregates is repressed. Further, the hold up time in the mixing device can be controlled and it can be prevented from being lengthened or shortened unduly.

The grooves are preferred to be disposed on the circumferences of rotation of the stirring feathers because the grooves so disposed serve the purpose of preventing the water-absorbent resin randomly scattered by the stirring feathers from succumbing to the phenomenon of short pass and consequently drifting to the exhaust port.

The weirs are preferred to be disposed in the neighborhood of the exhaust port or between the adjacent disintegrating blades. When they are disposed in the neighborhood of the exhaust port, it is commendable to have feeding feathers disposed in front and backward each of the weirs. The feeding feathers so disposed are capable of preventing the weirs from being blocked by the water-absorbent resin.

In this invention, it is further preferable to have the inner wall of the horizontal paddle rotary type mixing device formed of material manifesting the interfacial contact angle of not less than 60° to water and possessing a temperature of heat distortion of not lower than 70° C. The inner wall answering this description can prevent adhesion of the water-absorbent resin and allow effective prevention of the occurrence of aggregates. The material used herein may be the same as described in the first aspect of the invention.

The filling factor of the water-absorbent resin, the amounts of addition of the water-absorbent resin and the aqueous solution, and the method of adding the water-absorbent resin may be the same as described in the first aspect of this invention.

The third aspect of this invention is directed toward a method for modifying a water-absorbent resin comprising a step of mixing a water-absorbent resin possessing a carboxyl group and an aqueous solution containing a surface cross-linking agent, wherein said aqueous solution is mixed so that a W/D ratio of the volume (D) of the water-absorbent resin prior to the addition thereto of said aqueous solution to the volume (W) of the water-absorbent resin after addition falls in the range of 1.2-2.5.

In this invention, it has been found by a study regarding the W/D ratio in the device that when the W/D ratio preferably falls in the range of 1.2-2.5 and more preferably in the range of 1.3-1.7, the water-absorbent resin and the aqueous solution excel in the mixability without reference to the kinds of the water-absorbent resin and the surface cross-linking agent to be used, the amounts of their addition, and the kind and the size of the mixing device. When the water-absorbent resin and the aqueous solution are mixed while they are kept in a stirred state, they engulf the ambient air and increase their apparent volumes in consequence of the increase of the volume of the water-absorbent resin. To be specific, if the W/D falls short of 1.2, the shortage will result in stirring the water-absorbent resin insufficiently and rendering uniform mixture difficult. Conversely, if the W/D exceeds 2.5, the excess will result in allowing no easy contact between the water-absorbent resin and the aqueous solution, rendering uniform mixture difficult, and degrading the performance of the modified water-absorbent resin after heating.

This invention has discovered that the occurrence of aggregates can be repressed by specifying the W/D. When this condition is satisfied, no restriction needs to be imposed on the kind of the mixing device, the speed of mixture, the hold up time and the filling factor of the water-absorbent resin, the amount of the aqueous solution to be added, and the method of addition. Meantime, for the purpose of mixing the water-absorbent resin and the aqueous solution in a short period of time with a high productivity while repressing the occurrence of aggregates, it is advisable to use a rotary type mixing device which is equipped with stirring vanes. While the stirring vanes may be in any of the known shapes such as a plow, a blade, a fan, and a beam. It is commendable, however, to use plow-shaped stirring vanes in respect that they excel in the ability to suspend the water-absorbent resin. The rotational frequency of the stirring vanes preferably falls in the range of 100-5,000 rpm and more preferably in the range of 200-4,000 rpm. If the rotational frequency falls short of 100 rpm, the shortage will possibly result in revealing deficiency in stirring force and rendering uniform mixture difficult. Conversely, if the rotational frequency exceeds 5,000 rpm, the excess will result in inducing mechanical fracture of the water-absorbent resin.

In this invention, the filling factor of the water-absorbent resin in the mixing device falls in the range of 0.1-0.7 kg/L, preferably in the range of 0.2-0.7 kg/L, more preferably 0.2-0.6 kg/L, and more preferably 0.2-0.4 kg/L. If the filling factor falls short of 0.1 kg/L, the shortage will possibly result in unduly increasing the empty space part in the mixing device, allowing no easy contact between the water-absorbent resin and the aqueous solution, and disabling acquisition of uniform mixability. Conversely, if the filling factor exceeds 0.7 kg/L, the excess will result in inhibiting movability of the water-absorbent resin and the aqueous solution and degrading the mixability as well. In this invention, the mixture of the water-absorbent resin and the aqueous solution may adopt the factors of the first aspect of this invention excepting the specifications mentioned above. In this invention, the W/D ratio can be adjusted in the specific range by properly setting the kind of the mixing device, the shape and the number of stirring vanes, the filling factor of the water-absorbent resin, the shape, particle diameter, and bulk specific gravity of the water-absorbent resin, the amount of the aqueous solution to be added, and the size of the liquid drops.

The fourth aspect of this invention is directed toward a method for the production of the water-absorbent resin which includes a step of modification mentioned above.

By uniformly mixing the water-absorbent resin and the surface cross-linking agent-containing aqueous solution in accordance with the method described above and heating the resultant mixture, it is made possible to produce a water-absorbent resin having a cross-linked surface and an exalted the absorption capacity under pressure. This heat treatment and the subsequent cooling can be carried out by any of the known methods.

Now, the methods of modification according to the first, second, and third aspects of this invention and the method for the production of the water-absorbent resin according to the fourth aspect of this invention will be described in detail below.

As the water-absorbent resin which possesses a carboxyl group prior to a treatment for surface cross-linkage, a hydrophilic cross-linked polymer capable of swelling with water and incapable of dissolving in water which is obtained, for example, by polymerizing a hydrophilic unsaturated monomer having acrylic acid and/or a salt thereof as a main component and which, when placed in deionized water, absorbs 50 to 1,000 times its own weight of water may be cited.

The hydrophilic cross-linked polymer is preferred to have 30 mol %-100 mol %, more properly 50 mo %-90 mol %, and particularly properly 60 mol %-80 mol % of the acid group in the cross-linked polymer neutralized with an alkali metal salt, an ammonia salt, or an amine salt. The "water-absorbent resin possessing a carboxyl group" contemplated by this invention, therefore, is construed as embracing "a water-absorbent resin possessing a carboxyl group and/or a salt thereof." The neutralization of the acid group may be carried out during the preparation of the hydrophilic unsaturated monomer prior to the production of the cross-linked polymer, namely before starting the polymerization reaction. It may be performed during the polymerization. Otherwise, the acid group of the cross-linked polymer obtained after completion of the polymerization reaction may be neutralized. Optionally, these procedure may be used in combination. The hydrophilic unsaturated monomer mentioned above, when necessary, may contain an unsaturated monomer other than acrylic acid or a salt thereof. As concrete examples of such other monomer, anionic unsaturated monomers and salts thereof such as methacrylic acid, maleic acid, vinyl sulfonic acid, styrene sulfonic acid, 2-(meth) acrylamide-2-methylpropane sulfonic acid, 2-(meth)acryloyl ethane sulfonic acid, and 2-(meth) acryloyl propane sulfonic acid; nonionic hydrophilic group-containing unsaturated monomers such as acrylamide, methacrylamide, N-ethyl(meth)acrylamide, N-n-propyl (meth) acrylamide, N-isopropyl (meth) acrylamide, N,N-dimethyl(meh)acrylamide, 2-hydroxyethyl(meth)acrylate, 2-hydroxypropyl (meth)acrylate, methoxypolyethylene glycol(meth)acrylate, polyethylene glycol mono(meth)acrylate, vinyl pyridine, N-vinylpyrrolidone, N-acryloyl piperidine, and N-acryloyl pyrroridine; and cationic unsaturated monomers such as N,N-dimethylaminoethyl(meth)acrylate, N,N-diethylaminoethyl(meth)acrylate, N,N-dimethylaminopropyl(meth)acrylate, N,N-dimethylaminopropyl(meth)acrylamide, and quaternary salts thereof may be cited, though not limitatively. The amount of such other monomer to be additionally used is preferably not more than 30 mol % and more preferably not more than 10 mol % based on the total amount of the hydrophilic unsaturated monomer.

During the production of the water-absorbent resin, it is preferred to incorporate therein a cross-linkage by using an inner cross-linking agent. The inner cross-linking agent mentioned above does not need to be particularly restricted but is only required to be a compound containing in the molecular unit thereof a plurality of reactive groups capable of reacting with the polymerizable unsaturated group and/or a carboxylic group. That is, the inner cross-linking agent has to be a compound possessing in the molecular unit thereof a plurality of substituent groups capable of copolymerizing with the hydrophilic unsaturated monomer and/or reacting with the carboxylic acid. The hydrophilic unsaturated monomer may be formed of a self-cross-linking type compound which forms a cross-linkage without use of the inner cross-linking agent.

As concrete examples of the inner cross-linking agent, N,N'-methylenebis(meth)acrylamide, (poly)ethylene glycol di(meth)acrylate, (poly) propylene glycol di (meth)acrylate, trimethylol proplane tri (meth) acrylate, trimethylol propane di(meth)acrylate, glycerin tri(meth)acrylate, glycerin acrylate, methacrylate, ethylene oxide-modified trimethylolpropane tri(meth)acrylate, pentaerythritol tetra (meth) acrylate, dipentaerythritol hexa (meth) acrylate, triallyl cyanurate, triallyl isocyanurate, triallyl phosplhate, triallyl amine, poly (meth)allyloxy alkanes, (poly) ethylene glycol diglycidyl ether, glycerol diglycidyl ether, ethylene glycol, polyethylene glycol, propylene glycol, glycerin, pentaerythritol, ethylene diamine, polyethylene imine, and glycidyl (meth) acrylate may be cited, though not limitatively. These inter cross-linking agents may be used either singly or in the form of a combination of two or more members. By using the inner cross-linking agent possessing a plurality of polymerizable unsaturated groups in the molecular unit among other inner cross-linking agents enumerated above, it is made possible to further enhance the absorption properties of the produced water-absorbent resin.

The amount of the inner cross-linking agent to be used preferably falls in the range of 0.0001-3 mol % based on the amount of the hydrophilic unsaturated monomer. During the production of the water-absorbent resin by the polymerization of the hydrophilic unsaturated monomer, the reaction system may add thereto a hydrophilic high polymer such as starch, a starch derivative, cellulose, a cellulose derivative, polyvinyl alcohol, polyacrylic acid (salt), or a cross-linked polyacrylic acid (salt); a chain transfer agent such as hypophosphorous acid (salt); or a water-soluble or water-dispersible surfactant.

The method for polymerizing the hydrophilic unsaturated monomer does not need to be particularly restricted. Such known methods as aqueous solution polymerization, reversed-phase suspension polymerization, bulk polymerization, and precipitation polymerization are available. The reaction conditions such as the reaction temperature and the reaction time do not need to be particularly restricted but may be properly set to suit the composition of the monomer components, for example.

During the polymerization of the hydrophilic unsaturated monomer, it is permissible to use a radical polymerization initiator such as potassium persulfate, sodium persulfate, ammonium persulfate, t-butyl hydroperoxide, hydrogen peroxide, or 2,2'-azobis(2-amidinopropane) dihydro-chloride; a radical photopolymerization initiator such as 2-hydroxy-2-methyl-1-phenyl-propane-1-on; and an active energy ray such as ultraviolet light or electron beam. When an oxidizing radical polymerization initiator is used, a reducing agent such as sodium sulfite, sodium hydrogen sulfite, ferrous sulfate, or 1-ascorbic acid may be additionally used to effect redox polymerization. The amount of such a polymerization initiator to be used falls preferably in the range of 0.001 mol %-2 mol % and more preferably in the range of 0.01 mol %-0.5 mol %.

The hydrogel polymer obtained by the method of polymerization described above has the solid content thereof adjusted by drying. For drying the hydrogel polymer, an ordinary drying device or heating furnace can be used. For example, a thin stirring and drying device, a rotary drying device, a disc drying device, a fluidized-bed drying device, an air current drying device, an infrared drying device, etc. are available. The product of drying consequently obtained has a solid content which falls generally in the range of 85-100 wt. % (the water content 15-0 wt. %) and preferably in the range of 90-98 wt. % (the water content 10-2 wt. %) Incidentally, the solid content is obtained by weight loss on drying at 180° C.×3 hours generally.

The dry product obtained by the drying mentioned above maybe used in its unmodified form as a water-absorbent resin. Optionally, it may be further pulverized and classified, with the result that the product will be used as a particulate water-absorbent resin having a prescribed particle size. In this case, the particle size is not more than 2 mm and preferably not more than 850 μm. The weight average particle diameter, though variable with the purpose of use, falls generally in the range of 100 μm-1,000 μm, preferably in the range of 150 μm-800 μm, and more preferably in the range of 300 μm -600 μm. The proportion of particles passing a sieve of an aperture of 150 μm is preferably not more than 15 wt. %, more preferably not more than 10 wt. %, and still more preferably not more than 5 wt. %.

The water-absorbent resin which is obtained as described above may be in any of various forms such as spheres, scales, amorphous crushed fragments, fibers, granules, beams, approximate spheres, and flat pieces.

As concrete examples of the water-absorbent resin which answers the description given above, the hydrolyzate of a starch-acrylonitrile graft polymer (JP-B-1974-43395), the neutralized starch-acrylic acid graft polymer (JP-A-1976-125468), the saponified vinyl acetate-acrylic ester copolymer (JP-A-1977-14689), the hydrolyzate of an acrylonitrile copolymer or acrylamide copolymer (JP-B-1978-15959), the cross-linked derivatives thereof, the cross-linked partially neutralized polyacrylic acid (JP-A-1980-84304) and similar cross-linked polyacrylic acid (JP-A-1987-156102, JP-A-1993-112654, JP-A-1999-71424, JP-A-1992-214734, JP-A-1997-235378, JP-A-1999-349625, JP-A-2002-201290, International Unexamined Patent Publication JP-2002-527547, and JP-A-2002-212204) may be cited.

In this invention, the aqueous solution is added through the nozzle 40 to the water-absorbent resin mentioned above. The powder temperature of the water-absorbent resin prior to the addition thereto of the aqueous solution is adjusted preferably in the range of 80-35° C., more preferably in the range of 70-35° C., and still more preferably in the range of 50-35° C. The water-absorbent resin which has undergone this temperature adjustment is mixed with the aqueous solution. If the temperature of the water-absorbent resin prior to the addition thereto of the aqueous solution is unduly high, the excess of temperature will result in rendering the mixture of the aqueous solution not uniform. If the temperature is adjusted to a level falling short of 35° C., the shortage will be at a disadvantage in requiring an unduly long time for forced cooling or spontaneous cooling, suffering the powder resulting from the spontaneous cooling to reveal a discernible sign of aggregation, and adding to the energy spent for reheating.

The surface cross-linking agent to be used in this invention does not need to be particularly restricted but is only required to be a compound which possesses in the molecular unit thereof a plurality of functional groups capable of reacting with the two or more carboxyl groups possessed by the aqueous solution and which is enabled to form a covalent bond by a cross-linking reaction. As concrete examples of the surface cross-linking agent, polyol such as ethylene glycol, propylene glycol, glycerin, pentaerythritol, sorbitol, diethylene glycol, triethylene glycol, tetraethylene glycol, dipropylene glycol, tripropylene glycol, 1,3-butane diol, 1,4-butane diol, 1,3-pentadiol, 1,4-pentadiol, 1,5-pentadiol, 2,4-pentadiol, 1,6-hexane diol, 2,5-hexane diol, and trimethylol propane, polyamine compounds such as diethanol amine, triethanol amine, ethylene diamine, diethylene triamine, and triethylene tetramine, polyglycidyl compounds such as ethylene glycol diglycidyl ether, polyethylene glycol diglycidyl ether, glycerol polyglicidyl ether, diglycerol polyglicidyl ether, polyglycerol polyglicidyl ether, propylene glycol diglicidyl ether, and polypropylene glycol glicidyl ether, and polyvalent aziridine compounds such as 2,4-trilene diisocyanate, ethylene carbonate (1,3-dioxolan-2-on), propylene carbonate (4-methyl-1,3-dioxolan-2-on), 4,5-dimethyl-1,3-dioxolan-2-on, (poly, di, or mono)$_2$-oxazolidinone, epichlorohydrin, epibromohydrin, diglycol silicate, and 2,2-bishydroxymethyl butanol-tris[3-(1-aziridinyl) propionate] may be cited, though not limitatively. These surface cross-linking agents may be used either singly or in the form of a combination of two or more members. Among those surface cross-linking agents enumerated above, at least one member of the combination is preferred to be selected from among polyol, polyglycidyl compounds, 1,3-dioxolan-2-on, poly-2-oxazolidinone, bis-2-oxazolidinone and mono-2-oxazolidinone. At least one surface cross-linking agent is preferred to contain a polyol. This invention allows use of a metal salt such as aluminum sulfate, (poly) aluminum chloride, (poly)aluminum hydroxide, magnesium chloride, calcium chloride, zirconium carbonate, potassium alum, or ammonium alum which is capable of reacting with the carboxyl group as a surface cross-linking agent.

The amount of the surface cross-linking agent to be used, though variable with the compounds to be used and their combination, falls preferably in the range of 0.001-5 parts by weight and more preferably in the range of 0.005-2 parts by weight based on 100 parts by weight of the solid content of the water-absorbent resin. If the amount of the surface cross-linking agent exceeds the range mentioned above, the excess will not only prove uneconomical but also result in giving rise to a surplus of the surface cross-linking agent in the formation of the optimum cross-linkage in the water-absorbent resin. Conversely, if this amount falls short of the lower limit of the range mentioned above, the shortage will possibly result in rendering difficult the acquisition of a surface cross-linked water-absorbent resin possessing a high absorption capacity under pressure.

For dissolving the surface cross-linking agent, it is commendable to use water as the solvent. The concentration of the surface cross-linking agent in the aqueous solution is adjusted in the first, second, and third aspect of the invention described above, to the optimum magnitude such that the aqueous solution may prove favorable for the water-absorbent resin. The amount of water to be used, through variable with the kind of the water-absorbent resin and the particle diameter thereof, preferably exceeds 0 and does not exceed 20 parts by weight and more preferably falls in the range of 0.5-10 parts by weight based on 100 parts by weight of the solid content of the water-absorbent resin.

During the mixture of the water-absorbent resin and the surface cross-linking agent, it is permissible to use a hydrophilic organic solvent when necessary. As concrete examples of the hydrophilic organic solvent, lower alcohols such as methyl alcohol, ethyl alcohol, n-propyl alcohol, isopropyl alcohol, n-butyl alcohol, isobutyl alcohol, and t-butyl alcohol; ketones such as acetone; ethers such as dioxane, tetrahydrofuran, and alkoxypolyethylene glycohol; amides such as N,N-dimethyl formamide; and sulfoxides such as dimethyl sulfoxide may be cited. The amount of the hydrophilic organic solvent to be used, though variable with the kind of the water-absorbent resin and the particle diameter thereof, preferably does not exceed 20 parts by weight and more preferably falls in the range of 0-10 parts by weight, still more preferably in the range of 0-5 parts by weight, and particularly preferably in the range of 0-1 part by weight, based on 100 parts by weight of the solid content of the water-absorbent resin. Since this invention enjoys excellent mixability, it can accomplish uniform mixture without particularly requiring use of a hydrophilic solvent.

The liquid temperature of the aqueous solution is preferred to be lower than the powder temperature of the water-absorbent resin. It is preferably not less than 10° C., more preferably not less than 20° C., and particularly preferably not less than 30° C. lower than the powder temperature of the water-absorbent resin. Incidentally, since the aqueous solution is sprayed through the nozzle 40, the liquid temperature thereof ought to be higher than the solidifying temperature. If the liquid temperature of the aqueous solution is unduly high, the excess will be at a disadvantage in heightening the speed at which the water-absorbent resin absorbs a liquid and obstructing the uniform mixture.

The liquid drop of the aqueous solution is preferred to have an average particle diameter smaller than the average particle diameter of the water-absorbent resin. Specifically, it is preferably not more than 300 μm and more preferably not more than 250 μm. The maximun spray angle through the nozzle 40 is preferably not less than 50°. The aqueous solution is preferred to be sprayed through the nozzle 40 in the form of an empty cone to form an annular spray pattern or sprayed through the nozzle 40 in the form of an elliptic cone forming a spray pattern of a biconvex lens as described in JP-A-2002-201290. In this method, the preferred maximun spray angle is not less than 50°. If the angle falls short of 50°, the shortage will possibly result in giving rise, in the state of diffusion of the aqueous solution sprayed into the mixing device, to a part having the aqueous solution dispersed excessively and a part having the aqueous solution dispersed at a low density and consequently producing a bias in the state of mixture of the water-absorbent resin and the aqueous solution. The maximun spray angle is not more than 180° on account of the construction of the nozzle 40.

Further, when the aqueous solution is sprayed through the nozzle 40 so as to form the prescribed angle mentioned above, the area formed by projecting the state of diffusion of the spray of the aqueous solution on the cross section lying perpendicularly to the direction of axis of the mixing device and including the point of spray of the nozzle 40 is preferably not less than 70% and not more than 100%, more preferably not less than 80% and not more than 100%, and still more preferably not less than 90% and not more than 100% of the cross section lying perpendicularly to the direction of axis of the mixing device. If the cross section falls short of 70%, the shortage will be at a disadvantage in forming a bias in the state of mixture of the water-absorbent resin and the aqueous solution.

The mixing device may be equipped with only one nozzle 40 or with two or more nozzles 40 as occasion demands. For the purpose of enlarging the area formed by projecting the state of diffusion of the spray on the cross section of the mixing device including the point of spraying of the nozzle 40 mentioned above, two or more nozzles 40 prove advantageous. The mixing device to be used during the mixture of the water-absorbent resin and the aqueous solution is preferred to be endowed with a large mixing power for the sake of enabling the two components to be mixed uniformly and infallibly. It is preferred to keep the water-absorbent resin stirred or fluidified with an air current.

The mixing device mentioned above is a plow-shaped mixing device in the case of the first aspect of this invention, a horizontal paddle rotation type mixing device including a turburizer or a plow-shaped mixing device in the case of the second aspect of the invention, and a cylindrical type mixing device, a double wall conical type mixing device, a V-shaped mixing device, a ribbon type mixing device, a screw type mixing device, a fluidized bed type furnace rotary disc type mixing device, a fluidized type mixing device, a twin arm type kneader, an inner mixing device, a pulverizing type kneader, a rotary type mixing device, or a screw type extruding device in the case of the third aspect of this invention. Then, the high-speed stirring type mixing device equipped with a stirring axis fitted with a plurality of paddles is preferred to be a plow-shaped mixing device or a blade type mixing device. The term "high-speed stirring mixing device" as used herein refers to a mixing device which generates a mixing force by the rotation of the stirring axis fitted with a plurality of paddles at a rotational frequency falling generally in the range of 100 rpm-5,000 rpm, preferably in the range of 200 rpm-4,000 rpm, and more preferably in the range of 500 rpm-3,000 rpm.

In the first aspect of this invention, the inner wall of the mixing device is preferred to be formed of material manifesting the interfacial contact angle of not less than 60° to water and possessing a temperature of heat distortion of not lower than 70° C. with the object of preventing the mixture of the water-absorbent resin and the aqueous solution from adhering to the inner wall and forming aggregates consequently. By the same token, the devices used in the second and third aspects of the invention may be equipped with such an inner wall.

The inner wall of the mixing device is preferred to have a temperature exceeding the room temperature. The temperature of the inner wall of the mixing device preferably exceeds 40° C. and more preferably falls in the range of 50-100° C. Further, the temperature of the inner wall of the mixing device is preferred to be higher than the temperature of the water-absorbent resin. Specifically, the temperature difference is preferably not more than 40° C. and more preferably not more than 20° C. If the temperature of the inner wall of the mixing device falls short of the room temperature, the shortage will possibly result in suffering the mixture formed during the mixture of the aqueous solution and the water-absorbent resin to adhere to the inner wall and form aggregates consequently.

In this invention, the aqueous solution may further add thereto a surfactant as a dispersing agent, particulates for exalting the effect of mixture, a metal complex as a denaturing agent, and anti-fungus agent, deodorant, perfume, food additive, oxidizing agent, reducing agent, chelating agent, antioxidant, radical inhibitor, and pigment as other additives, when necessary, in the form of an aqueous solution solved or dispersed in a solvent besides the surface cross-linking agent, through a separate nozzle.

As the surfactant usable as a separating agent, nonionic, anionic, cationic, or amphoteric surfactant having a HLB value of not less than 3 which is disclosed in International Unexamined Patent Publication JP-2002-527547 may be used in an amount in the range of 0-5 wt. %, based on the amount of the water-absorbent resin. As the particulates mentioned above, such inorganic particulates as carabon black which are described in JP-A-1992-214734 may be used in an amount in the range of 0-10 parts by weight based on 100 parts by weight of the water-absorbent resin. Then, as the metal complex to be used as a denaturing agent, a divalent or polyvalent metal salt solution described in JP-2002-527547 may be used.

The anti-bacterial agent mentioned above is a known anti-bacterial agent possessing the ability to resist bacterium and does not need to be particularly restricted. The anti-bacterial agents enumerated in JP-A-1999-267500 may be cited as concrete examples. The deodorant mentioned above is a known deodorant which is capable of deodorizing such offensively smelling components of human urine as mercaptan, hydrogen sulfide, and ammonia and does not need to be particularly restricted. The extracts of the plants of family Camelliaceae which have flavanols and flavonols as deodorizing components may be cited as concrete examples. Though the amount of the additive to be added for the purpose of conferring an additional function on the water-absorbent resin may be properly varied to suit the purpose of addition and the kind of the additive, it falls preferably in the range of 0.001-10 parts by weight, more preferably in the range of 0.01-5 parts by weight, and still more preferably in the range of 0.05-1 part by weight based on 100 parts by weight of the water-absorbent resin.

In this invention, the water-absorbent resin and the aqueous solution are introduced into the mixing device and mixed therein under the conditions described above in the first, second, and third aspect of this invention.

When the mixture consequently obtained is subsequently introduced into the heat-treating device and heated therein, the surface cross-linkage aimed at is initiated. In this heat treatment, the temperature of the water-absorbent resin is kept preferably in the range of 60-250° C., more preferably in the range of 80-250° C., still more preferably in the range of 100-230° C., and particularly preferably in the range of 150-210° C., though variable with the kind of the surface cross-linking agent to be used. If this temperature of heat treatment falls short of 60° C., the shortage will be at a disadvantage in obstructing formation of a uniformly cross-linkage and consequently disabling production of a surface cross-linked water-absorbent resin having a high absorption capacity under pressure. Further, this heat treatment consumes an unduly long time and induces degradation of the productivity. If the temperature of the heat treatment exceeds 250° C., the excess will be at a disadvantage in inducing deterioration of the water-absorbent resin and consequently degrading the performance of the surface cross-linked water-absorbent resin.

As the heating device for treating the water-absorbent resin powder under these conditions, the known drying deice or heating furnace which is equipped with a gas feeding device or a gas exhausting device adapted to establish the atmosphere specified above may be used. As the gas for use in the device mentioned above, steam, air, and nitrogen are available. The amount of feeding this gas may be properly decided. Though the gas for adjusting the temperature and the dew point may be properly decompressed or pressed or properly heated or cooled, it is generally proper that the air be supplied in the neighborhood of room temperature (for example, 0-50° C.) under substantially normal pressure ($1.013 \times 10^5$ Pa (1 atmosphere) ±10%, preferably ±5%, and more preferably ±1%). For example, electroconductive heat conducting type, radiant heat conducting type, hot air conducting type, and induction heat conducting type drying devices or heating furnaces which are furnished with a gas feeding device or a gas exhausting device prove suitable. As concrete examples, belt type, groove stirring type, screw type, rotary type, disc type, mulling type, fluidized bed type, air current type, infrared type, and electron ray type drying devices or heating furnaces furnished with a device for feeding air and/or a mixed gas with an inert gas may be cited. Among those types of heat treatment enumerated above, the type of heat treatment which resorts to electro-conductive heat conduction or hot air conduction or even stirs or fluidizes and meantime heats the water-absorbent resin and further controls the atmosphere in the upper empty space of the heat-treating device which has escaped attention as well by means of electroconductive heat conduction proves particularly advantageous. When the water-absorbent resin is heated by electroconductive heat conduction, it is commendable to heat the water-absorbent resin by the heat transfer surface heated with a thermal material (such as, for example, the wall surface and the stirring vanes of the paddle type drying device) and, at the same time, control the empty space not exposed to the heat transfer surface and formed on the bed of the water-absorbent resin at the specified temperature and the specified dew point. Even in the continuous heat treatment having a volume of treatment of 10 kg/hr, further 100 kg/hr, further 1,000 kg/hr, further 2,000 kg/hr, and further 3,000 kg/hr, the heat treatment may be properly utilized without being affected by the size (scale factor) of the device.

This invention may be performed in the mode using both or in the mode using either one of the step of spraying and mixing the aqueous solution and the step of heat-treating it.

The fifth aspect of this invention is directed toward a plow-shaped mixing device equipped with a plow-shaped stirring vane fitted with a disintegrating blade, which is furnished with an inner wall formed of material manifesting the interfacial contact angle of not less than 60° to water and possessing a temperature of heat distortion of not lower than 70° C., and said inner wall is equipped on the circumference of rotation of said plow-shaped stirring vane with a groove part producing a gap in the range of 1-30 mm from said inner wall. The device may be further equipped in the interior thereof with weirs and/or feeding feathers. The device can be advantageously used for the methods of modifying the water-absorbent resin in the first, second, and third aspects of this invention and can be advantageously used for the method of producing the water-absorbent resin including the method of modification mentioned above.

The plow-shaped mixing device of this invention is composed, as illustrated in FIG. 1, of a drive unit 10, a horizontal drum 20, a raw material supply port 30, an aqueous solution supply nozzle 40, an exhaust port 50, and disintegrating blades 61, the drum being furnished therein with an inner wall 60 formed of material manifesting the interfacial contact angle of not less than 60° to water and possessing a temperature of heat distortion of not lower than 70° C., and the inner wall being furnished with groove parts 65 so formed as to insert a distance in the range of 1-30 mm between the plow-shaped stirring vanes and the inner wall. The plow-shaped mixing device has existed and the mode of optionally disposing the disintegrating blades 61 has existed. This invention is characterized by the device being equipped with the inner wall formed of the specific material and the inner wall being furnished with specific groove parts mentioned above. By the device being equipped with the inner wall formed of the specific material, it is made possible to repress the adhesion of the water-absorbent resin and the consequent growth of the deposit and further repress the occurrence of aggregates. Meanwhile, in the plow-shaped mixing device, the plurality of plow-shaped stirring vanes disposed around the axis of rotation are rotated. The inner wall disposed anew narrows the interior of the drum. If the inner wall 60 has a uniform thickness, the clearance between the inner wall 60 and the stirring vanes 73 will decrease on the circumference of rotation of the stirring vanes 73 and the water-absorbent resin will be kneaded and prevented from being uniformly mixed. An experiment performed in search of the distance between the inner wall and the stirring vanes 73 which suppresses the occurrence of aggregates and permits uniform mixture has revealed that the uniform mixture is attained and the occurrence of aggregates is eliminated when the shortest distance, $I_3$, illustrated in FIG. 3 is in the range of 1-30 mm. In this invention, the largest distance, $I_4$, between the stirring vanes 73 and the inner wall 60 may be larger than the upper limit of the range mentioned above.

The plow-shaped mixing device of this invention is characterized by being equipped with the inner wall formed of a specific material and by the inner wall being furnished thereon with groove parts of a specific depth as compared with the known countertype. While the other factors of this device may be identical with those of the known mixing device, they are still preferred to fall in the ranges described above with respect to the first aspect of this invention. The clearance of disposition of the plow-shaped stirring vanes 73, the number of these vanes to be disposed, the places for disposition of the disintegrating blades 61, the places for disposition of the weirs 63 and the feeding feathers 75, and the numbers thereof, therefore, may be incorporated in one or more modes arbitrarily added to the plow-shaped mixing device. Incidentally, the plow-shaped mixing device is one kind of a horizontal paddle rotation type mixing device and the plow-shaped stirring vanes are one mode of paddles.

The material for forming the inner wall mentioned above, specifically the kind of the material manifesting the interfacial contact angle of not less than 60° to water and possessing a temperature of heat distortion of not lower than 70° C. may be selected from the range specified in the first aspect of this invention.

The drum of the plow-shaped mixing device is generally made of a metallic material. The inner wall of the material mentioned above may be formed by coating the metal material forming the inner wall of the drum with this material. Otherwise, the inner wall may be formed by inserting a cylindrical member formed of the material into the inner wall of the drum.

The groove parts may be formed on the inner wall after the inner wall has been formed inside the device or they may be formed in advance in the inner wall and the inner wall may be then inserted in the interior of the device. The formation of the groove parts in the inner wall which has been already inserted in the interior of the device may be attained, for example, by attaching stirring vanes designed exclusively for the formation of the grooves to the leading terminal parts of the plow-shaped stirring vanes and rotating the rotary shaft thereby imparting the grooves in the inner wall or by heating the stirring vanes to a temperature exceeding the temperature of heat distortion of the material and melting the inner wall and forming the grooves in the thermally softened inner wall.

The disintegrating blades may be equipped by inserting them from the outer surface of the drum and advancing them in the direction of the normal via a seal of the axis. The positions for disposing the disintegrating blades do not need to be limited to the circumference of the drum. For the purpose of promoting the disintegrating of the water-absorbent resin accumulated on the bottom surface of the interior of the drum, it is commendable to have the feathers disposed in the lower half of the circumference divided into two vertically halved circles. Though the method for driving the disintegrating blades does not need to be particularly restricted, the drive may be executed by using an electric motor or a pneumatic motor. The use of the electric motor proves preferable by reason of the ease of control. While the shape of the disintegrating blades does not need to be particularly restricted, the feathers resembling the curved vanes of a turbine prove advantageous because the disintegrating action and the driving force are small.

The method for attaching the weirs to the inner wall does not need to be particularly restricted. The weirs may be formed as expected, for example, by raising ribs from the circumference of the inner wall of the drum and fastening the weirs to the ribs by means of bolts and screws or by welding a metal or fusing a resin directly on the circumference. This invention prefers the method which comprises raising ribs from the inner surface of the drums and fastening the weirs to the ribs by means of bolts and screws because the height/aperture ratio of the weirs can be easily controlled.

The water-absorbent resin produced by this invention exhibits an absorption capacity determined by the method adopted in the working examples cited herein below in the range of 10-60 g/g, preferably in the range of 20-55 g/g, and more preferably in the range of 25-50 g/g. Further, this resin exhibits an absorption capacity under pressure determined by the method adopted in the working examples cited herein below at a level of not less than 10 g/g, preferably not less than 15 g/g, and more preferably not less than 20 g/g. Therefore, the water-absorbent resin obtained by this invention can be used as an absorbing agent also.

EXAMPLES

Now, the present invention will be described more specifically below with reference to working examples and comparative example.

Example 1

In a kneader equipped with two sigma type blades, an aqueous monomer solution containing a monomer composed of sodium acrylate, acrylic acid, and water at a monomer concentration of 35 wt. % and having a ratio of neutralization of 70 mol % was prepared and polyethylene glycol diacrylate (average ethylene glycol unit number: 9) was solved therein as an inner cross-linking agent till a concentration of 0.04 mol % (relative to the monomer). Then, nitrogen gas was blown into the aqueous monomer solution to lower the dissolved oxygen concentration in the aqueous monomer solution and displace the whole interior of the reaction vessel with nitrogen. Subsequently, sodium persulfate was added till 0.12 g/mol (relative to the monomer) and L-ascorbic acid till 0.005 g/mol (relative to the monomer) as polymerization initiators. The temperature of the aqueous monomer solution was 15° C. When the aqueous monomer solution started polymerization, the stirring was discontinued and the polymerization was continued while the reaction system was kept at rest. When the polymerization temperature reached 50° C., the blades were again set rotating to continue the polymerization in a stirred state in the kneader. About 50 minutes thereafter, a hydrogel polymer having an average particle diameter of about 2 mm was obtained.

The hydrogel polymer thus obtained was dried with a hot air drying device at 170° C. for about 60 minutes. Then, the dried polymer was pulverized with a roll mill pulverizing device and classified with a sieve having an aperture of 850 μm and a sieve having an aperture of 105 μm to botain a water-absorbent resin (1) having a water content of 4% and a particle diameter of 380 μm.

To a plow-shaped mixing device made of stainless steel and equipped therein with an inner wall made of polyethylene tetrafluoride and furnished on the circumference of rotation of a plow-shaped stirring vanes illustrated in FIG. 1 with groove parts having a width in the range of 20-30 mm and a depth in the range of 10-15 mm and disintegrating blades, 100 parts by weight of the water-absorbent resin (1) and 3.5 parts by weight of a surface cross-linking agent containing aqueous solution containing 1,4-butane diol:propylene glycol:water=0.3:0.5:2.7 were continuously supplied and mixed. The gap between the stirring vanes and the inner wall in the absence of the grooves was about 2 mm.

The packing factor was 0.35 kg/L, the average hold up time was 60 seconds, the rotational frequency of the plow-shaped stirring vanes was 285 rpm, the rotational frequency of the disintegrating blades made of stainless steel was 180° rpm, and the W/D ratio was 1.42.

In the computation of the W/D ratio, the volume (D) of the water-absorbent resin prior to the addition of the aqueous solution was determined by placing the water-absorbent resin of a prescribed amount in the stirring mixing device. The volume (W) of the water-absorbent resin after the mixture of the aqueous solution was found from the volume of the water-absorbent resin which was wet after completion of the operation.

The wet water-absorbent resin showed proper mixability. When the wet water-absorbent resin was screened through a sieve of 10 mm, the aggregates stopped on the sieve accounted for a proportion of 0.1%. After termination of the operation, the interior of the mixing device showed virtually no discernible sign of adhesion of extraneous matter.

By heat-treating the wet water-absorbent resin with a twin paddle drier at a water-absorbent resin temperature of 205° C. over the average hold up time of 50 minutes, a modified water-absorbent resin (1) was obtained.

The modified water-absorbent resin (1) was found to have the absorption capacity of 35 (g/g) and an absorption capacity under pressure of 25 (g/g).

The absorption capacity was determined by causing a sample to stand in an aqueous 0.90 wt. % physiological saline solution under no pressure for 30 minutes and calculating the absorption capacity and the absorption capacity under pressure was determined by causing a sample to stand in an aqueous 0.90 wt. % physiological saline solution under a pressure of 4.83 kPa for 60 minutes and calculating the absorption capacity under pressure.

Their determinations were performed as follows.

(1) Absorption capacity: Under the conditions of room temperature (20-25° C.) and a humidity of 50 RH %, a bag made of non-woven fabric (60 mm×60 mm, made by Nangoku Pulp Kogyo K.K. and sold under the trademark designation of "Heatron Paper GSP22") was uniformly filled with 0.20 g of a given water-absorbent resin powder and then sealed and kept immersed in a large excess (for example, not less than 100 g) of the aqueous 0.9 wt. % physiological saline solution. After the elapse of 30 minutes thence, the bag was pulled out of the bath, drained by the use of a centrifugal separator (made by Kokusansha K.K. and sold under the product code of "H-122") at 250 G for three minutes, and weighed to find the weight $W_1$ (g). The same procedure was repeated on the bag containing neither the water-absorbent resin nor an absorbing agent to find the weight $W_0$ (g). The absorption capacity (g/g) was calculated in accordance with the following formula using $W_1$ and $W_0$.

Absorption capacity(g/g)=$(W_1(g)-W_0(g))$/the weight of water-absorbent resin(g)

Where the water-absorbent resin means an absorbing agent comprising the water-absorbent resin as a main component, the absorption capacity is calculated using weight of the absorbing agent instead of the weight of water-absorbent resin.

(2) Absorption capacity under pressure: A 400-mesh wire gauze made of stainless steel (having a mesh size of 38 μm) was fused to the bottom of a plastic supporting cylinder having an inside diameter of 60 mm. Under the conditions of room temperature (20-25° C.) and humidity of 50 RH %, 0.90 g of a water-absorbent resin was uniformly scattered on the wire gauze, a piston adjusted to exert a load of 4.83 kPa (0.7 psi) on the absorbing agent and having an outside diameter slightly smaller than 60 mm to as to avoid forming a gap between itself and the supporting cylinder and produce an unobstructed vertical motion and a load were mounted on the water-absorbent resin sequentially in the order mentioned. The weight Wa (g) of the whole system of this measuring device was measured.

A glass filter having a diameter of 90 mm (pore diameter: 100-120 μm; made by Sougo Rikagaku Glass K.K.) was placed inside a petri dish having a diameter of 150 mm and an aqueous 0.90 wt. % pysiological saline solution (20-25° C.) was added to the petri dish to reach a level flush with the upper surface of the glass filter. One filter paper 90 mm in diameter (having a thickness of 0.26 mm and a retaining particle diameter of μm; made by Advantec Toyo K.K. and sold under the product code of "JIS P 3801, No. 2) was placed thereon to wet the entire surface thereof, with the excess liquid removed from the surface.

The whole system of the measuring device mentioned above was placed on the wet filter paper and allowed to absorb the liquid under the load. After the elapse of one hour thence, the whole system of the measuring device was pulled up and the weight Wb (g) thereof was measured. The absorption capacity under pressure (g/g) was calculated in accordance with the following formula using Wa and wb.

Absorption capacity under pressure (g)=($Wa$(g)–$Wb$ (g))/Weight of the water-absorbent resin(0.9 g)

Where the water-absorbent resin means an absorbing agent comprising the water-absorbent resin as a main component, the absorption capacity under pressure is calculated using weight of the absorbing agent instead of the weight of water-absorbent resin.

Example 2

An water-absorbent resin and a surface cross-linking agent-containing aqueous solution were mixed continuously by following the procedure of Example 1 while keeping the disintegrating blades in a stopped state during the course of the operation.

When the wet water-absorbent resin consequently obtained was screened through a sieve of 10 mm, the aggregates stopped on the sieve accounted for a proportion of 10%.

The wet water-absorbent resin which had passed the sieve was heat-treated with a twin paddle drier at a water-absorbent resin temperature of 205° C. over the average hold up time of 50 minutes to afford a modified water-absorbent resin (2).

The water-absorbent resin (2) thus obtained was found to have the absorption capacity 35 (g/g) and the absorption capacity under pressure of 24 (g/g).

Example 3

An water-absorbent resin and a surface cross-linking agent-containing aqueous solution were continuously mixed by following the procedure of Example 1 while using a mixing device not equipped with a cylinder made of polyethylene tetrafluoride.

The wet water-absorbent resin consequently obtained showed a sign of uneven mixture. When this wet water-absorbent resin was screened through a sieve of 10 mm, the aggregates stopped on the sieve accounted for a proportion of about 40 wt. %. The inside of the barrel of the mixing device and the periphery of the stirring shaft showed a sign of adhesion of the wet water-absorbent resin.

The wet water-absorbent resin which had passed the sieve was heat-treated with a twin paddle drier at a water-absorbent resin temperature of 205° C. over the average hold up time of 50 minutes to afford a water-absorbent resin (3).

The water-absorbent resin (3) was found to have the absorption capacity 32 (g/g) and the absorption capacity under pressure of 18 (g/g).

Example 4

Continuous mixture was performed by following the procedure of Example 1 while changing the filling factor to 0.5 kg/L, the average holdup time to 90 seconds, the rotational frequency of the stirring vanes to 285 rpm, and the W/D to 1.52.

The wet water-absorbent resin consequently obtained showed proper mixability. When the wet water-absorbent resin was screened through a sieve of 10 mm, the aggregates stopped on the sieve accounted for a proportion of 0.2%.

After completion of the operation, the interior of the device showed substantially no sign of adhesion of the extraneous matter.

The wet water-absorbent resin was heat-treated with a twin paddle drier at a water-absorbent resin temperature of 205° C. over the average hold up time of 50 minutes to afford a modified water-absorbent resin (4).

The modified water-absorbent resin (4) thus obtained was found to have the absorption capacity 36 (g/g) and the absorption capacity under pressure of 24 (g/g).

Example 5

Continuous mixture was performed by following the procedure of Example 1 while changing the filling factor to 0.1 kg/L, the average holdup time to 60 seconds, the rotational frequency of the stirring vanes to 285 rpm, and the W/D to 2.62.

The wet water-absorbent resin consequently obtained showed a sign of uneven mixture. When the wet water-absorbent resin was screened through a sieve of 10 mm, the aggregates stopped on the sieve accounted for a proportion of about 10%.

After completion of the operation, the stirring vanes in the mixing device showed a sign of adhesion of the extraneous matter.

The wet water-absorbent resin which had passed the sieve was heat-treated with a twin paddle drier at an absorbent rein temperature of 205° C. over the average hold up time of 50 minutes to afford a water-absorbent resin (5).

The water-absorbent resin (5) was found to have the absorption capacity 32 (g/g) and the absorption capacity under pressure of 22 (g/g).

Example 6

Continuous mixture was performed by following the procedure of Example 1 while changing the filling factor to 0.75 kg/L, the average hold up time to 60 seconds, the rotational frequency of the stirring blades to 285 rpm, and the W/D to 1.15.

The wet water-absorbent resin consequently obtained showed a sign of uneven mixture. When the wet water-absorbent resin was screened through a sieve of 10 mm, the aggregates stopped on the sieve accounted for a proportion of about 20%. After completion of the operation, the stirring vanes inside the mixing device showed a sign of adhesion of the extraneous matter.

The wet water-absorbent resin which has passed the sieve was heat-treated with a twin paddle drier at a water-absorbent resin temperature of 205° C. over the average hold up time of 50 minutes to afford a water-absorbent resin (6).

The water-absorbent resin (6) was found to have the absorption capacity 34 (g/g) and the absorption capacity under pressure of 15 (g/g).

Example 7

A batch operation was performed in the place of the continuous operation of Example 1, with the hold up time set at 10 minutes. The W/D was 1.15.

When the wet water-absorbent resin consequently obtained was screened through a sieve of 10 mm, the aggregates stopped on the sieve accounted for a proportion of 15%.

The stirring vanes in the mixing device showed a sign of adhesion of the extraneous matter.

The wet water-absorbent resin which had passed the sieve was heat-treated with a twin paddle drier at a water-absorbent resin temperature of 205° C. over the average hold up time of 50 minutes to afford a water-absorbent resin (7).

The water-absorbent resin was found to have the absorption capacity 32 (g/g) and the absorption capacity under pressure of 24 (g/g).

Comparative Example 1

A water-absorbent resin and a surface cross-linking agent-containing aqueous solution were continuously mixed by following the procedure of Example 3 while changing the filling factor to 0.75 kg/L, the average hold up time to 60 seconds, the rotational frequency of the stirring vanes to 285 rpm, and the W/D to 1.15.

Since the load of the motor of the mixing device rose during the course of the mixture, the mixture was discontinued.

A wet matter was found to be adhering conspicuously to the periphery of the stirring shaft of the mixing device and the water-absorbent resin was found to be partially clogging the gap between the stirring vanes and the barrel.

The invention claimed is:

1. A method for modifying a water-absorbent resin comprising a step of mixing a water-absorbent resin possessing a carboxyl group and an aqueous solution containing a surface cross-linking agent, wherein said water-absorbent resin and said aqueous solution are mixed with a mixing device equipped with a plow-shaped stirring vane and a disintegrating blade, an inner wall of which device is formed of material manifesting the interfacial contact angle of not less than 60° to water and possessing a temperature of heat distortion of not lower than 70° C.

2. A method according to claim 1, wherein the speed of the plow-shaped stirring vane in said device is in the range of 100-500 rpm and the hold up time of a mixture of said water-absorbent resin and said aqueous solution in said device is in the range of 10 seconds-three minutes.

3. A method for modifying a water-absorbent resin comprising a step of mixing a water-absorbent resin possessing a carboxyl group and an aqueous solution containing a surface cross-linking agent, wherein said water-absorbent resin and said aqueous solution are mixed with a rotary type mixing device equipped on the inner wall thereof with a weir, and/or equipped on the circumference of rotation of a stirring vane on said inner wall with a groove part so formed as to insert a distance in the range of 1-30 mm between said inner wall and said stirring vane.

4. A method for modifying a water-absorbent resin comprising a step of mixing a water-absorbent resin possessing a carboxyl group and an aqueous solution containing a surface cross-linking agent, wherein said aqueous solution is mixed so that a W/D ratio of the volume (D) of the water-absorbent resin prior to the addition thereto of said aqueous solution to the volume (W) of the water-absorbent resin after addition falls in the range of 1.2-2.5.

5. A method for the production of a water-absorbent resin comprising a step of modification set forth in claim 1.

6. A method for the production of a water-absorbent resin comprising a step of modification set forth in claim 2.

7. A method for the production of a water-absorbent resin comprising a step of modification set forth in claim 3.

8. A method for the production of a water-absorbent resin comprising a step of modification set forth in claim 4.

9. The method of claim 1, wherein said plow-shaped stirring vane is fitted with said disintegrating blade, which is furnished with said inner wall formed of material manifesting the interfacial contact angle of not less than 60° to water and possessing a temperature of heat distortion of not lower than 70° C., and said inner wall is equipped on the circumference of rotation of said plow-shaped stirring vane with a groove part producing a gap in the range of 1-30 mm from said inner wall.

10. The method of claim 9, which further comprises a weir, a feeding feather, or both.

11. The method of claim 2, wherein said plow-shaped stirring vane is fitted with said disintegrating blade, which is furnished with said inner wall formed of material manifesting the interfacial contact angle of not less than 60° to water and possessing a temperature of heat distortion of not lower than 70° C., and said inner wall is equipped on the circumference of rotation of said plow-shaped stirring vane with a groove part producing a gap in the range of 1-30 mm from said inner wall.

12. The method of claim 11, which further comprises a weir, a feeding feather, or both.

\* \* \* \* \*